United States Patent [19]

Yashchenko et al.

[11] Patent Number: 5,158,695
[45] Date of Patent: Oct. 27, 1992

[54] DIAMOND-BASED ANTIFRICTION MATERIAL

[76] Inventors: Nikolay K. Yashchenko, Gerpev Dnepra 13, Kv. 106; Vladimir V. Ogorodnik, Prospekt Korneichuka 15, kv. 129, both of Kiev, Ukraine, U.S.S.R.

[21] Appl. No.: 784,562

[22] Filed: Oct. 29, 1991

[51] Int. Cl.$^5$ .................. C10M 103/04; B22F 1/00
[52] U.S. Cl. .................................... 252/30; 252/29; 252/28; 252/25; 75/252; 75/243; 419/11
[58] Field of Search ............... 252/30, 29, 28, 26, 252/25; 75/252, 243; 419/11

[56] References Cited

U.S. PATENT DOCUMENTS

| | | | |
|---|---|---|---|
| 2,561,709 | 7/1951 | Norling | 75/243 |
| 3,203,775 | 8/1965 | Cantrell | 75/243 |
| 4,013,570 | 3/1977 | Lemmer | 252/30 |
| 4,747,873 | 5/1988 | Kamioka | 75/243 |
| 4,871,394 | 10/1989 | Baker et al. | 75/243 |
| 4,872,333 | 10/1989 | Burnand | 75/243 |
| 4,941,919 | 7/1990 | Asada et al. | 75/243 |

Primary Examiner—Prince Willis, Jr.
Assistant Examiner—James Silbermann
Attorney, Agent, or Firm—Ilya Zborovsky

[57] ABSTRACT

Antifriction material includes sintered intermetallides of copper with zinc and tin, and ultradispersed diamond powder having grain size below 0.1 micrometer.

1 Claim, No Drawings

DIAMOND-BASED ANTIFRICTION MATERIAL

DESCRIPTION

1. Technical Field

Our invention relates to an antifriction material which can be used in machine-building and in particular in transportation machine building, such as for example for producing of cylinder liners of internal combustion engines, which are subjected to wear due to friction. The new material can be also used to replace bronze bushes of piston pins, oil pumps, reducers and other aggregates, and also to make substantially wearless sliding bearings, bushless internal combustion engines, etc.

2. Background art

It is known that the running-in of friction pairs is connected with a removal of a material of the rubbing surfaces which are saturated with defects caused by a finishing mechanical treatment. At this stage increased friction occurs in the pairs and leads to scores and burns. In order to increase antiscoring properties, solid lubricants are used which are introduced, into the relief of the rubbing surfaces, for example by rubbing-in with bars from an antifriction material of preliminarily honed surfaces of the rubbing parts.

Antifriction materials in form of bars are known for treating (by rubbing-in) of a working surface of cylinder liners of internal combustion engines to impart antiscoring properties to the surface, as disclosed in Soviet inventor's certificate No. 988,530 filed on Jun. 28, 1981. Here the treatment is performed successively with two bars including a hard bar and a soft bar with the use of a film-forming polymer. The hard bar is composed of a metal (copper and tin), antifriction component (molibdenum disulfide), graphite, hexagonal boron nitride) and a filler (ferrous oxide). The soft bar is composed of a fusible material (lead, lead oxide). The film-forming polymer is used for retaining the antifriction particles of the material of the bars on the working surface of the liner. Weak bond of the antifriction components of material of the bars with the treated surface, burning of the polymer in the starting period of operation of the engine do not permit achieving of significant improvement of the tribotechnical properties. Scoring strength measured by time before scoring on friction measuring machines does not exceed 26 seconds.

A composite material which includes (mass%) metal 40-70 (copper and tin with 4:1 ratio), antifriction admixture 10-30 (graphite and molibdenum disulfide), filler (ferrous oxide) the rest is disclosed in the Inventor's certificate No. 916,249 filed on Jul. 25, 1980. It has the same disadvantage in that it does not have soft intermetallide phases and strong bond of the material of the bar with the treated surface. Due to this the antifriction coating is not durable. This material, however, has a higher scoring strength up to 41 seconds.

The most pertinent material is an antifriction material which includes (mass%) copper 43.5-48.5, tin 0.5-1, zinc 24-45, graphite 10-21.5, cubic boron nitride 1-5, as disclosed in the Soviet Inventor's certificate No. 1,378,421, filed on Dec. 9, 1985. This material permits obtaining in the antifriction bar of soft intermetallide phases CuZn, CuSn, CuZnSn which efficiently fill the relief of the working surface. It increases the scoring strength to 60 seconds.

This material is used on Soviet plants which produce cylinder liners of internal combustion engines. Friction mechanism of phases CuZn and CuZnSn is described in reports of International Conference "Reliability of Internal Combustion Engines", 1985 in Tashkent, Section "Friction, Wear and Lubricants", Papers, v.3.2.2, Published by "Fan", Tashkent, 1985, p.p. 102-104, and also in the articles "Study of Structure of Working Surface of Liners After Antifriction Flatpeak Honing" in the magazine "Superhard Materials", 1991, No. 1, p.p. 60-65; "Tribotechnical Properties of Cylinder Liners of Internal Combustion Engines, Treated by Antifriction Flat-peak Honing" in the magazine "Friction and Wear", v.8, No. 1, p.p. 173-177.

DISCLOSURE OF THE INVENTION

In accordance with the present invention we provide an antifriction material which includes sintered intermetallides of copper with zinc and tin, and in addition includes an ultradispersed diamond powder with the following composition (mass %)

CuZn 48-88
CuSn 0.5-3
CuZnSn- 1.5-4
Diamond- 5.0-50.

When the antifriction material has the above specified composition in accordance with the present invention, it provides high antiscoring properties of frictional surfaces.

BEST MODE FOR CARRYING OUT THE INVENTION

In accordance with the present invention, an antifriction material is proposed which contains sintered intermetallides of copper with zinc and tin, and in addition includes an ultradispersed powder of diamond. The materials can have the composition which includes (mass%) 48-88 of CuZn, 0.5-3 of CuSn, 1.5-4 of CuZnSn, and 5-50 of diamond.

The new material is produced by powder metallurgy by sintering in hydrogen medium. The hardness of the material is 30-50 HB. Rubbing-in of a working surface which preliminarily was subjected to flatpeak honing, performed with the bars of the inventive material led to filling of the relief of the working surface. This reduced the friction coefficient between the liner and the piston ring and correspondingly increased the scoring strength to more than 110 seconds, with simultaneous reduction of fuel consumption per unit power, oil consumption by burning during the operation.

The bonding component of the new material has high plasticity, reduced hardness for required removal by the treated part. The diamond powder is an ultradispersed powder. The material significantly increases the scoring strength and thereby increases the wear resistance of the working surface of the cylinder liners of internal combustion engine. As a result, the service life of the engine is increased, inoperability of the engines due to scoring is reduced, consumption of fuel and oil due to burning is reduced, running-in of the engines is shortened or eliminated.

The inventive antifriction material is produced by powder metallurgy. In order to make the bars, a mixture of copper, zinc, tin, diamonds is used in quantities needed to obtain the above listed components in the specified ranges. Powders of copper, zinc, tin are mixed with the diamond powder, the mixture is pressed and then sintered. The sintered antifriction bars were used for rubbing-in of liners of cylinder blocks on the honing machine. Then the liners were tested on friction machine, and the scoring strength was determined by a time till scoring occurs. The measure of scoring is reaching of contact temperature in the area of contact of a roller of the machine and a tested part and a depression formed in the tested part (liner). The depth of the depression is a value of wear and coefficient of friction. For many compositions of the inventive material no depression was formed upon reaching of the contact temperature. The test results showing the scoring strength measured in time till the scoring occurs are presented in the table.

| No. of Material | Composition of Material (% mass) | | | | Scoring Strength (Sec) |
|---|---|---|---|---|---|
| | CuZn | CuSn | CuZnSn | Diamond | |
| 1 | 90 | 3.5 | 4.5 | 2 | 45 |
| 2 | 88 | 3 | 4 | 5 | 85 |
| 3 | 85 | 2 | 3 | 10 | 108 |
| 4 | 75 | 2 | 3 | 20 | 110 |
| 5 | 66 | 1.5 | 2.5 | 30 | 112 |
| 6 | 48 | 0.5 | 1.5 | 50 | 90 |
| 7 | 43.8 | 0.4 | 0.8 | 55 | 55 |
| Prototype | | | | | 60 |

As can be seen from the table the compositions 2-6 have higher scoring strength than that of the prototype. The reduction of the scoring strength in the material 6 is connected with increase in brittleness of the material and thereby worse filling of the relief of the treated surface and reduction of adhesion to it. Further increase of the diamond component leads to sharp increase in brittleness and as a result to flaking of the material during treating and worsening of the relief filling. Material 2 has a lower scoring strength due to increased friction coefficient. Further sharp reduction of scoring strength in material 1 is connected with reduction of antifriction component and limited adhesion of the material with the treated surface. Here the time till scoring is determined by the time of removal of antifriction material from the contact zone of the friction surfaces due to the increase of friction coefficient. Materials 3 and 4 provide the increase in the scoring strength 1.8 times as compared with prototype. There is no depression and therefore the running in of the engines with the cylinders treated with the inventive material is not necessary.

The ultradispersed diamond powder used in the new material has the grain size lower than 0.1 micrometer. The grain size is selected taking into consideration that during the formation of intermetal phases it reinforces the formed structure. Since diamonds have the lowest friction coefficient and high thermal conductivity, therefore on contact surfaces sharp reduction of friction coefficient and increase in the speed of thermal dissipation take place. Homogenous distribution of diamond particles in intermetals and the grain size which is incommensurable with the maximum roughness excludes abrasive wear in the zone of friction contact.

The use of the powders with higher grain size leads to faster wear of the rubbing surfaces, and the wear increases with the increase of the grain size. Reduction of the grain size reduces the speed of wear of the friction surfaces and reduces the friction coefficient so that the latter approaches the friction coefficient of diamonds.

We claim:

1. Antifriction material comprising sintered intermetallides of copper with zinc and tin; and ultra-dispersed diamond powder with grain size below 0.1 micrometer, the antifriction material having the following composition, %mass:

CuZn 48-88
CuSn 0.5-3
CuZnSn- 1.5-4
Diamond- 5.0-50.

* * * * *